United States Patent
Shioiri et al.

(10) Patent No.: US 10,066,682 B2
(45) Date of Patent: Sep. 4, 2018

(54) SHAFT SUPPORT STRUCTURE FOR SELECTABLE ONE-WAY CLUTCH

(71) Applicant: TOYOTA JIDOSHA KABUSHIKI KAISHA, Toyota-shi, Aichi (JP)

(72) Inventors: Hiroyuki Shioiri, Yokohama (JP); Hideaki Komada, Gotemba (JP); Yuki Kurosaki, Susono (JP); Hiroyuki Shibata, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 161 days.

(21) Appl. No.: 14/979,650

(22) Filed: Dec. 28, 2015

(65) Prior Publication Data

US 2016/0186818 A1 Jun. 30, 2016

(30) Foreign Application Priority Data

Dec. 25, 2014 (JP) ................................ 2014-261963

(51) Int. Cl.
| | | |
|---|---|---|
| *F16D 41/12* | (2006.01) | |
| *F16D 23/12* | (2006.01) | |
| *F16D 27/10* | (2006.01) | |

(52) U.S. Cl.
CPC ........... *F16D 41/125* (2013.01); *F16D 23/12* (2013.01); *F16D 27/10* (2013.01)

(58) Field of Classification Search
CPC ........ F16D 41/125; F16D 41/14; F16D 27/10; F16D 27/108; F16D 27/118; F16D 41/12
See application file for complete search history.

(56) References Cited

U.S. PATENT DOCUMENTS

| | | | | |
|---|---|---|---|---|
| 6,290,044 | B1* | 9/2001 | Burgman | F16D 41/18 188/82.3 |
| 8,061,496 | B2* | 11/2011 | Samie | F16D 41/08 192/43 |
| 2003/0188918 | A1* | 10/2003 | Shimizu | B62D 5/0424 180/444 |
| 2010/0200358 | A1* | 8/2010 | Eisengruber | F16D 41/12 192/41 S |
| 2012/0145506 | A1* | 6/2012 | Samie | F16D 41/084 192/46 |
| 2016/0129864 | A1* | 5/2016 | Essenmacher | F16D 27/14 307/9.1 |

FOREIGN PATENT DOCUMENTS

| | | |
|---|---|---|
| JP | 2003-014108 A | 1/2003 |
| JP | 2008-082478 A | 4/2008 |
| WO | 2010/011478 A2 | 1/2010 |

* cited by examiner

*Primary Examiner* — Richard M Lorence
*Assistant Examiner* — Lori Wu
(74) *Attorney, Agent, or Firm* — Hunton Andrews Kurth LLP

(57) ABSTRACT

An actuator is fixed to a predetermined stationary member. A plunger is supported by a casing of the actuator while being allowed to reciprocate linearly. The plunger has a joint on an exposed area thereof that is connected to a selector plate. A leading end of the plunger from the joint is also supported while being allowed to reciprocate by a supporting member formed integrally with a stationary member to which the casing is fixed.

9 Claims, 5 Drawing Sheets

SHAFT SUPPORT STRUCTURE FOR SELECTABLE ONE-WAY CLUTCH

The present invention claims the benefit of Japanese Patent Application No. 2014-261963 filed on Dec. 25, 2014 with the Japanese Patent Office, the disclosure of which is incorporated herein by reference in its entirety.

BACKGROUND

Field of the Invention

Preferred embodiment relates to the art of a selectable one-way clutch adapted to selectively enable a torque transmission only in one direction and to interrupt torque transmission in both directions, and especially to a shaft support structure of an actuator for actuating the selectable one-way clutch.

Discussion of the Related Art

PCT international publication WO2010/011478 describes an example of a selectable one-way clutch (to be abbreviated as "SOWC" hereinafter). The selectable one-way clutch taught by WO2010/011478 comprises an inner race as a drive member, an outer race as a driven member, and a selector plate that allowed to rotate within a predetermined range. The selector plate is provided with a shift lever protruding outwardly toward a valve body assembly situated underneath the SOWC. An actuator mechanism comprising a linkage and a piston is arranged in the valve body assembly, and the linkage is allowed to move within a piston bore. A pair of collars is fitted onto the linkage while being brought into contact with an inner face of the bore to restrain the shaped end of the shift lever to provide a connection with the selector plate.

A return spring is fitted onto one end of the linkage opposite to the piston. The piston is in direct continuous contact with and/or operatively connected to the linkage. Thus, according to the teachings of PCT international publication WO2010/011478, the linkage and the piston are separated from each other to eliminate a load and a bending moment while eliminating friction between the piston or the linkage and the inner face of the bore.

In the SOWC, the selector plate is rotated by a linear motion of the actuator and hence the linkage may be subjected to a bending moment resulting from a friction a resistance at the connection. According to the teachings of PCT international publication WO2010/011478, since the linkage is supported by the pair of collars, a tilting of the linkage and resultant increase friction may be prevented. However, the collars and the structure for allowing a sliding motion of the collars may enlarge a size of the SOWC.

Aspects of preferred embodiment has been conceived noting the foregoing technical problems, and it is therefore an object of the preferred embodiment is to provide a shaft support structure of the SOWC that can simplify or downsize an actuator for rotating a selector plate by a linear motion thereof.

SUMMARY OF THE INVENTION

Preferred embodiment relates to a shaft support structure for a selectable one-way clutch, comprising: a first rotary plate and a second rotary plate opposed to each other while being allowed to rotate relatively with each other; a strut that is held in a pocket formed on a face of the first rotary member in such a manner to be projected selectively toward the second rotary member to be brought into engagement therewith so as to enable torque transmission therebetween; a selector plate that is interposed between the first rotary plate and the second rotary plate while being allowed to rotate within a predetermined range to selectively allow the strut to be projected toward the second rotary plate, and to push the strut into the pocket of the first rotary member to bring the strut into disengagement from the second rotary plate; and an actuator that is disposed on an outer circumferential side of the first rotary plate and the second rotary plate to rotate the selector plate by a linear motion of a plunger thereof connected to the selector plate along a tangential line of the selector plate. In order to achieve the above-explained objective, according to the preferred example, the shaft support structure is provided with: a casing of the actuator that supports the plunger while allowing to reciprocate linearly; a stationary member to which the casing is fixed; a joint arranged on an exposed area of the plunger to which the selector plate is connected; a supporting member formed integrally with the stationary member; and a shaft supporting portion that is formed in the supporting member to support a leading end portion of the plunger from the joint while allowing to reciprocate linearly. Optionally, shaft support structure may be further provided with a sensor that detects a position of the plunger at a point between the casing and the joint.

Thus, according to the preferred example, the selector plate is rotated by a linear motion of the plunger of the actuator to selectively allow the strut to be brought into engagement with the second rotary plate, and to push the strut into the pocket of the first rotary member to bring the strut into disengagement from the second rotary plate. The strut is supported by the casing of the actuator and the shaft supporting portion of the supporting member formed integrally with the casing. According to the preferred example, therefore, bending moment acting on the plunger may be absorbed by those supporting points so that the plunger can be prevented from being inclined. In addition, the casing of the actuator may be supported only one point so that the actuator may be downsized and a structure thereof may be simplified. Further, since the position of the plunger may be detected at a point between the casing and the supporting portion where the plunger does not move in the direction other than the axial direction. For this reason, the position of the plunger may be detected accurately.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
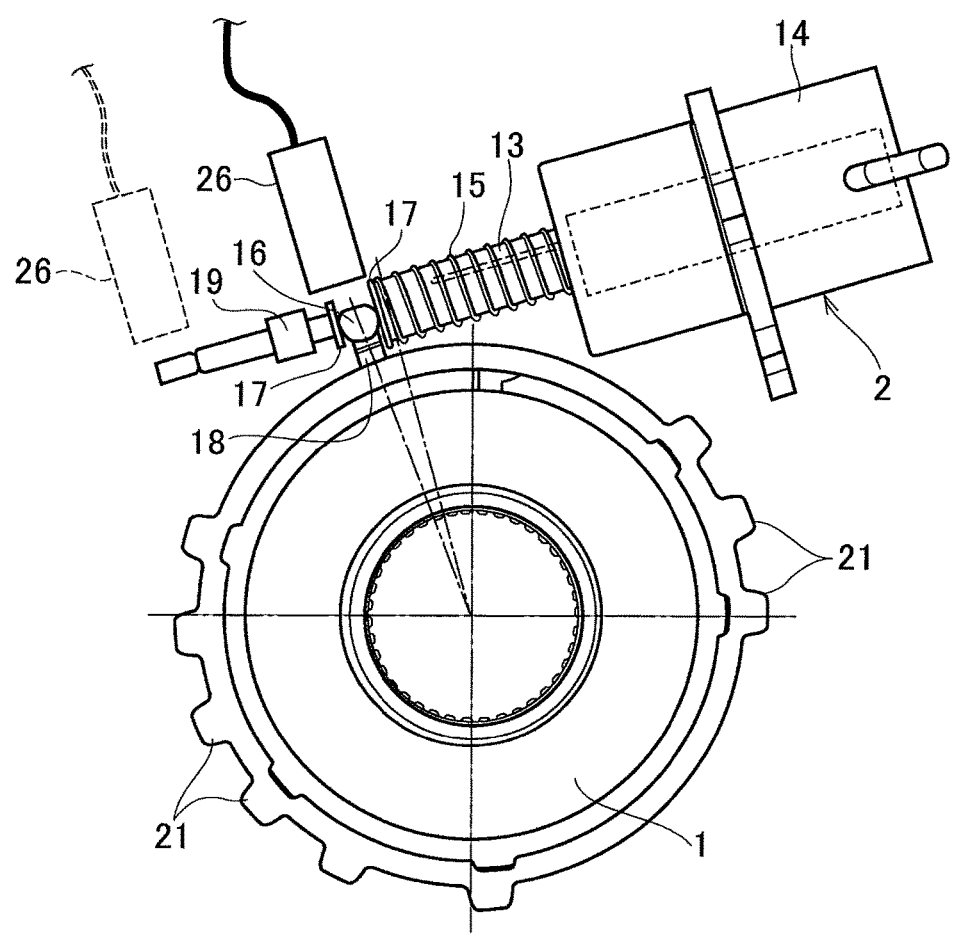
FIG. 1 is a front view of the SOWC according to the preferred embodiments.
Figure 2:
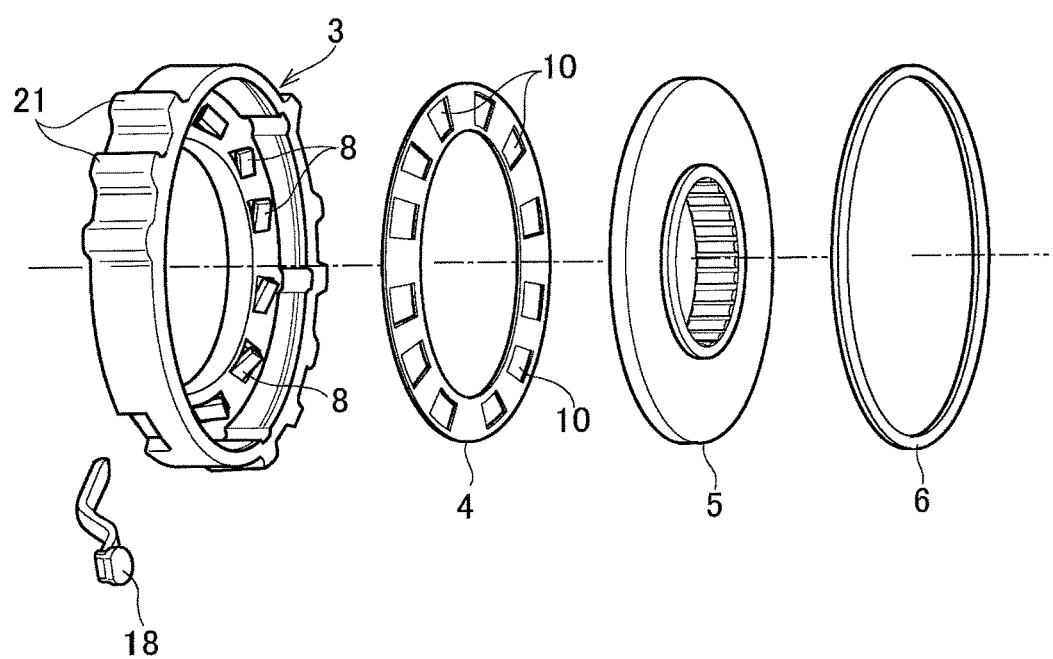
FIG. 2 is an exploded view of the SOWC shown in FIG. 1.

Referring now to FIG. 1, there is shown a shaft support structure according to the preferred example. As illustrated in FIG. 1, an actuator 2 for selectively bring a selectable one-way clutch (to be abbreviated as "SOWC" hereinafter) 1 into engagement is arranged on an outer circumferential side of the SOWC1. Each part of the SOWC 1 is depicted in detail in FIG. 2. As shown in FIG. 2, the SOWC 1 comprises a pocket plate 3 serving as the claimed first rotary plate, a selector plate 4, and a notch plate 5 serving as the claimed second rotary plate. The pocket plate 3 comprises an outer cylinder and an annular plate formed along an inner circumference of the cylinder. The selector plate 4 and the notch plate 5 are held in the cylinder in the order shown in FIG. 2, and a snap ring 6 is fitted into a clearance between an outer circumference of the notch plate 5 and an inner circumference of the cylinder of the pocket plate 3 to close the pocket plate 3.

Figure 3A:
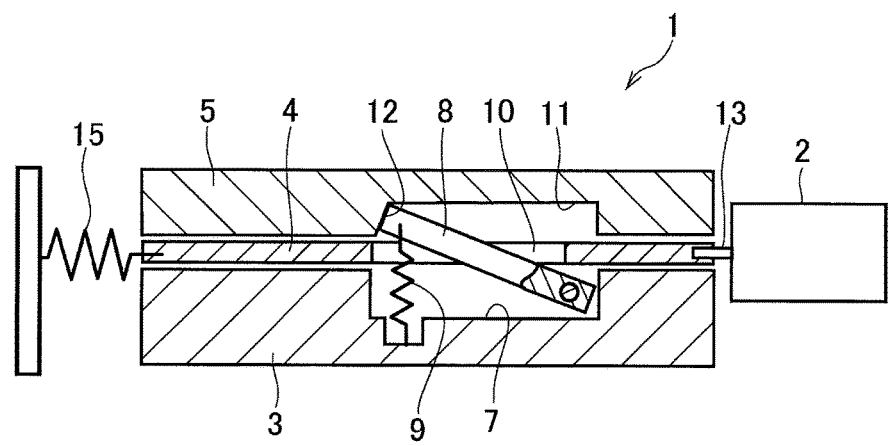
FIG. 3a is a partial cross-sectional view showing the SOWC in engagement.
Figure 3B:
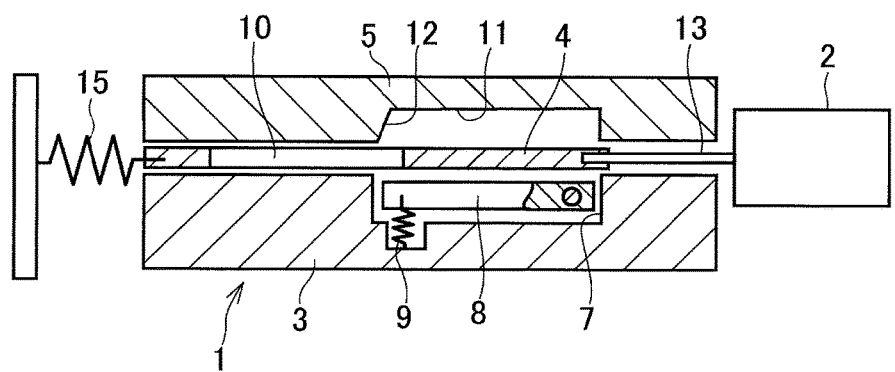
FIG. 3b is a partial cross-sectional view showing the SOWC in disengagement.

Turning now to FIGS. 3a and 3b, there is partially shown a cross-section of the SOWC 1 thus assembled. As illustrated in FIGS. 3a and 3b, a plurality of pockets (or depressions) 7 are formed in a circular manner on a face of the annular plate of the pocket plate 3 being opposed to the notch plate 5, and a rectangular strut 8 is individually held in each pocket 7 in a pivotal manner around one end thereof as a fulcrum. In order to push up the other end of the strut 8 toward the notch plate 5, a spring 9 is interposed between one end of the strut 8 and a bottom of the pocket 7.

The selector plate 4 is an annular member having similar dimensions as the annular plate of the pocket plate 3, and apertures 10 are formed on the selector plate 4 in a circular manner and in a same number as the pockets 7. As shown in FIG. 3a, when the selector plate 4 is rotated in the pocket plate 3 to a position at which the apertures 10 are individually overlapped with each of the pockets 7, said other end (to be called the "leading end" hereinafter) of each strut 8 is allowed to be pushed up by the spring 9 to be brought into engagement with an after-mentioned notch 11 of the notch plate 5. By contrast, when the selector plate 4 is rotated to a position at which the apertures 10 are individually displaced from each of the pockets 7, each strut 8 is pushed into the pocket 7 by the selector plate 4 as shown in FIG. 3b.

The notch plate 5 is also an annular member, and the notches 11 are formed on a face of the notch plate 5 facing to the pocket plate 3 in a circular manner and in the same number as the pockets 7. When the leading end of the strut 8 is pushed into the notch 11 through the aperture 10, the leading end of the strut 8 is brought into abutment to an engagement wall 12.

The actuator 2 is provided with a solenoid activated electromagnetically to rotate the selector plate 4 selectively to the position at which the apertures 10 are overlapped with the pockets 7 to bring the SOWC 1 into engagement, and to the position at which the apertures 10 are displaced from the pockets 7 to bring the SOWC 1 into disengagement. Specifically, a plunger 13 of the actuator 2 is connected to the selector plate 4, and the plunger 13 is pulled into a casing 14 by energizing the solenoid. In order to push the plunger 13 out of the casing 14 against the electromagnetic force of the solenoid, a coil spring 15 is fitted onto the plunger 13.

As illustrated in FIG. 1, one end of the plunger 13 is inserted into the casing 14 while being allowed to reciprocate linearly within the casing 14, and the plunger 13 is withdrawn into the casing 14 by a magnetic force. In order to suppress a bending moment arising from a difference in directions of reciprocation of the plunger 13 and rotation of the selector plate 4, a joint 16 is arranged on an intermediate portion of an exposed area of the plunger 13. Specifically, a pair of collars 17 is arranged at the intermediate portion of the exposed area of the plunger 13 while keeping a predetermined distance, an arm 18 is formed on the selector plate 4 to protrude outwardly while penetrating through the cylinder of the pocket plate 13. A leading end of the arm 18 is shaped into a round plate expanding in parallel with the annular plate of the pocket plate 3, and the round plate of the arm 18 is interposed between the pair of collars 17 while being in contact therewith. That is, the leading end of the arm 18 is allowed to rotate within the space between the collars 17 and hence the plunger 13 and the arm 18 can be prevented from being subjected to a bending moment even if the plunger 13 reciprocates linearly.

In order to push the plunger 13 out of the casing 14, the above-mentioned coil spring 15 is fitted onto the plunger 13 between the casing 14 and one of the collars 17. That is, the selector plate 4 is constantly pushed in the counter-clockwise direction by the coil spring 15, and stopped at a limit position by a stopper formed in the SOWC 1 or by a side face of the opening of the pocket plate 3 letting through the arm 18. The plunger 13 has a diametrically reduced leading end extending from the joint 16, and the diametrically reduced leading end is supported by a supporting member 19. Thus, the plunger 13 is supported by the casing 14 and the supporting member 19 while being allowed to reciprocate linearly.

Figure 4:
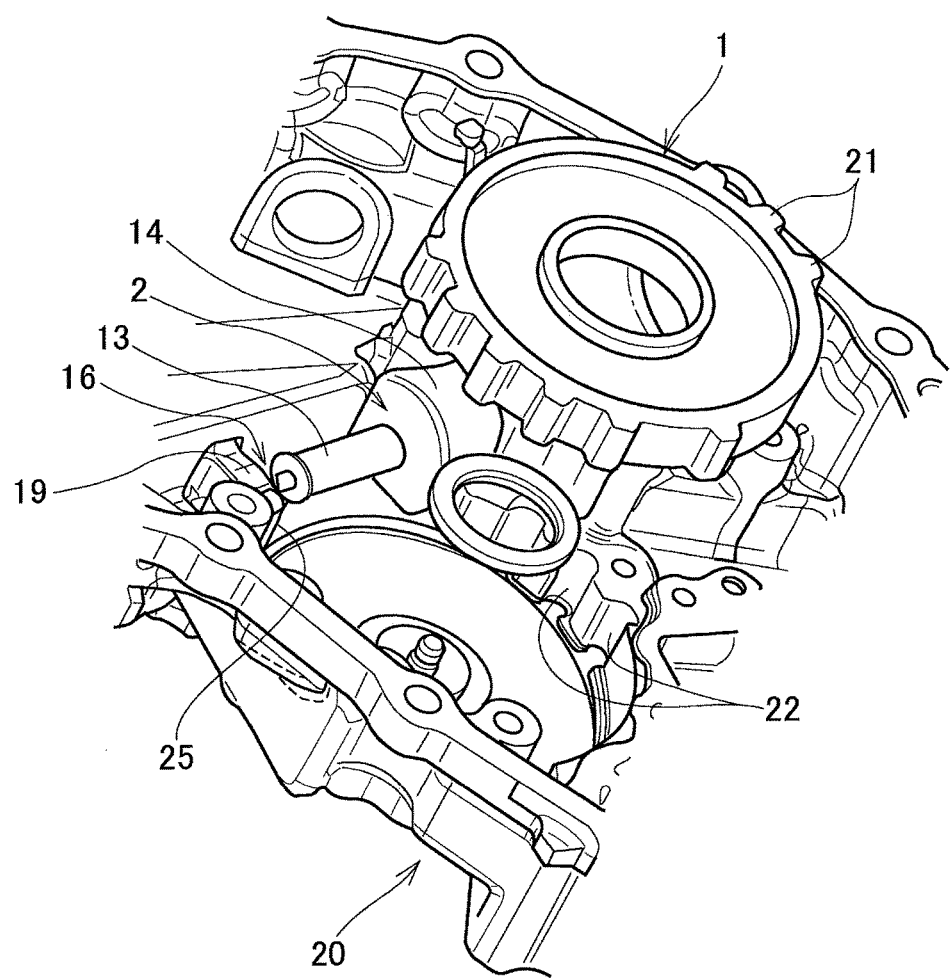
FIG. 4 is a perspective view showing a connection between the SOWC and the rear cover.
Figure 5:
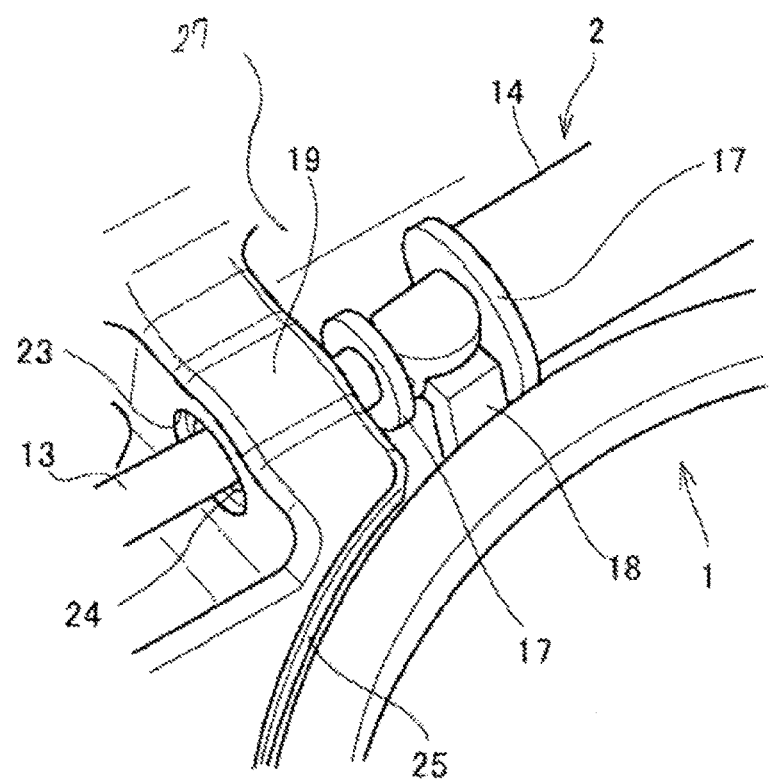
FIG. 5 is an enlarged view showing the shaft support structure.

Turning now to FIG. 4, there is shown an example of an installation of the supporting member 19. According to the example shown in FIG. 4, the SOWC 1 is attached to a rear cover 20 of a transaxle (not shown) by engaging a spline 21 formed around the pocket plate 3 with a spline 22 formed inside of the rear cover 20. In the rear cover 20, the casing 14 of the actuator 2 is fixed to the rear cover 20 in an outer circumferential side of the SOWC 1 so that the plunger 31 reciprocates along a tangential line of the SOWC 1. Thus, the rear cover 20 serves as the claimed stationary member. The supporting member 19 is situated in a leading end side of the plunger 13. As depicted in FIG. 5 in detail, the supporting member 19 is a plate member formed integrally with the rear cover 20 and perpendicular to the plunger 13. Accordingly, the supporting member 19 serves as the claimed supporting point. The supporting member 19 has a through hole 23 serving as the claimed shaft supporting portion, and the leading end of the plunger 13 is inserted into the through hole 23 through a bush 24 that allows the plunger 13 to reciprocate therein.

As illustrated in FIG. 5, the supporting member 19 may be connected to a periphery 27 of a clutch holder 25 holding the SOWC 1 therein. In this case, strength or stiffness of the clutch holder 25 may be enhanced by equalizing a thickness of the supporting member 19 with a width of the supporting member 19 (in the direction of the plunger 13 penetrating therethrough).

Turning back to FIG. 1, there is shown a sensor 26 for detecting a condition of the SOWC 1. Specifically, the sensor 26 is a contactless stroke sensor adapted to detect a position or an actuating distance of the plunger 13 and to transmit a signal representing a position of the plunger 13. According to the example shown in FIG. 1, the sensor 26 is disposed in the vicinity of the joint 16 between the casing 14 of the actuator 2 and the supporting member 19. Alternatively, as depicted by a dashed line, the sensor 26 may also be situated in the leading end side of the plunger 13.

The SOWC 1 is brought into disengagement by unenergizing the solenoid of the actuator 2. In this situation, the plunger 13 is pushed out of the casing 14 by the coil spring 15 so that the joint 16 is moved to the left side in FIG. 1. Consequently, the selector plate 4 is rotated counter-clockwise at a predetermined angle, and the apertures 10 are individually displaced from the pockets 7 while pushing the struts 8 into the pockets 7 as shown in FIG. 3 (b). As a result, each of the struts 8 is individually brought into disengagement from the notch 11 of the notch plate 5 so that the notch plate 5 is allowed to rotate in both directions. Such disengagement of the SOWC 1 may be detected by the sensor 26.

In this situation, if the solenoid of actuator 2 is energized, the plunger 13 is pulled into the casing 14 by the electromagnetic force against the elastic force of the coil spring 15. Consequently, the joint 16 of the plunger 13 is moved linearly in the axial direction of the plunger 13, but the arm 18 attached to the selector plate 4 is allowed to rotate on the collars 17 so that the selector plate 4 is rotated in the clockwise in FIG. 1. Eventually, the apertures 10 of the selector plate 4 are individually overlapped with the pockets 7 of the pocket plate 3 so that the struts 8 are individually pushed into the notches 11 of the notch plate 5 through the aperture 10 of the selector plate 4 as shown in FIG. 3 (a). As a result, the leading end of each strut 8 is individually brought into engagement with each of the engagement wall 12 of the notch 11 to enable torque transmission between the pocket plate 3 and the notch plate 5 through the struts 8. Given that the pocket plate 3 is connected to the rear cover 20 as described, a rotation of the notch plate 5 is halted in this situation.

By contrast, if the notch plate 5 is rotated in the direction to isolate each leading end of the strut 8 from the engagement wall 12, an upper face of each strut 8 is pushed into the pocket 7 by an opening edge of the notch 11 to allow the notch plate 5 to rotate relatively with the pocket plate 3. Consequently, the SOWC 1 is brought into disengagement, and as described, such disengagement of the SOWC 1 may be detected by the sensor 26.

Thus, switching operation of the SOWC 1 is realized by the linear motion of the plunger 13 of the actuator 2. However, the plunger 13 may be subjected to an offset load resulting from an eccentricity of the moving direction of the plunger 13 from a moving direction of the arm 18 or an uneven contact of the coil spring 15 to the collar 17. In order to prevent such disadvantage, according to the preferred example, the plunger 13 is supported at two points by the casing 14 and the supporting member 19 while being allowed to reciprocate. According to the preferred example, therefore, a bending moment derived from such offset load can be absorbed by those supporting points so that the plunger 13 can be prevented from being subjected to the bending moment. In addition, load acting on the supporting point is reduced so that frictional damage on the supporting point can be limited, and that the structure of the supporting member in the casing 14 can be simplified. Further, a sliding resistance of the plunger may also be reduced and hence a large axial force is unnecessary to actuate the plunger 13. For this reason, the actuator 2 may be downsized and simplified to prevent malfunction of the actuator 2.

Furthermore, since the sensor 26 may be disposed between the casing 14 and the supporting member 19, and the plunger 13 is supported at two points to prevent warpage, an engagement state of the SOWC 1 may be detected accurately by the sensor 26.

What is claimed is:

1. A selectable one-way clutch, comprising:
 a first rotary plate and a second rotary plate opposed to each other while being allowed to rotate relatively with each other;
 a strut that is held in a pocket formed on a face of the first rotary member in such a manner to be projected selectively toward the second rotary member to be brought into engagement therewith so as to enable torque transmission therebetween;
 a selector plate that is interposed between the first rotary plate and the second rotary plate while being allowed to rotate within a predetermined range to selectively allow the strut to be projected toward the second rotary plate, and to push the strut into the pocket of the first rotary member to bring the strut into disengagement from the second rotary plate;
 an actuator that is disposed on an outer circumferential side of the first rotary plate and the second rotary plate to rotate the selector plate by a linear motion of a plunger thereof connected to the selector plate along a tangential line of the selector plate;
 a casing of the actuator that supports the plunger while allowing to reciprocate linearly;
 a stationary member to which the casing is fixed;
 a joint arranged on an exposed area of the plunger to which the selector plate is connected;
 a supporting member formed integrally with the stationary member; and
 a shaft supporting portion that is formed in the supporting member to support a leading end portion of the plunger from the joint while allowing to reciprocate linearly,
 wherein the stationary member is a clutch holder holding the selectable one-way clutch therein,
 wherein the supporting member is connected to a periphery of the clutch holder,
 wherein the joint has a pair of collars arranged at an intermediate portion of the exposed area of the plunger while keeping a predetermined distance between the collars, and
 wherein a coil spring is fitted onto the plunger between the casing and one of the collars.

2. The selectable one-way clutch as claimed in claim 1, further comprising:
 a sensor that detects a position of the plunger at a point between the casing and the joint.

3. The selectable one-way clutch as claimed in claim 1, wherein the shaft supporting portion includes a through hole into which the leading end of the plunger is inserted.

4. The selectable one-way clutch as claimed in claim 3, wherein the through hole has a bush that allows the plunger to reciprocate therein.

5. The selectable one-way clutch as claimed in claim 1, further comprising:
 a sensor situated in the leading end side of the plunger.

6. A selectable one-way clutch, comprising:
 a first rotary plate and a second rotary plate opposed to each other while being allowed to rotate relatively with each other;
 a strut that is held in a pocket formed on a face of the first rotary member in such a manner to be projected selectively toward the second rotary member to be brought into engagement therewith so as to enable torque transmission therebetween;
 a selector plate that is interposed between the first rotary plate and the second rotary plate while being allowed to rotate within a predetermined range to selectively allow the strut to be projected toward the second rotary plate, and to push the strut into the pocket of the first rotary member to bring the strut into disengagement from the second rotary plate;
 an actuator that is disposed on an outer circumferential side of the first rotary plate and the second rotary plate to rotate the selector plate by a linear motion of a plunger thereof connected to the selector plate along a tangential line of the selector plate;
a casing of the actuator that supports the plunger while allowing to reciprocate linearly;
a stationary member to which the casing is fixed;
a joint arranged on an exposed area of the plunger to which the selector plate is connected;
a supporting member formed integrally with the stationary member; and
a shaft supporting portion that is formed in the supporting member to support a leading end portion of the plunger from the joint while allowing to reciprocate linearly,
wherein the stationary member is a clutch holder holding the selectable one-way clutch therein,
wherein the supporting member is connected to a periphery of the clutch holder,
wherein the shaft supporting portion includes a through hole into which the leading end of the plunger is inserted, and
wherein the through hole has a bush that allows the plunger to reciprocate therein.

7. The selectable one-way clutch as claimed in claim 6, further comprising:
a sensor that detects a position of the plunger at a point between the casing and the joint.

8. The selectable one-way clutch as claimed in claim 6, wherein the joint has a pair of collars arranged at an intermediate portion of the exposed area of the plunger while keeping a predetermined distance between the collars; and a coil spring is fitted onto the plunger between the casing and one of the collars.

9. The selectable one-way clutch as claimed in claim 6, further comprising:
a sensor situated in the leading end side of the plunger.

* * * * *